April 29, 1941.  C. I. HANEY  2,239,782
PRECIPITATION OF ORGANIC DERIVATIVES OF CELLULOSE MATERIALS
Filed Aug. 2, 1938
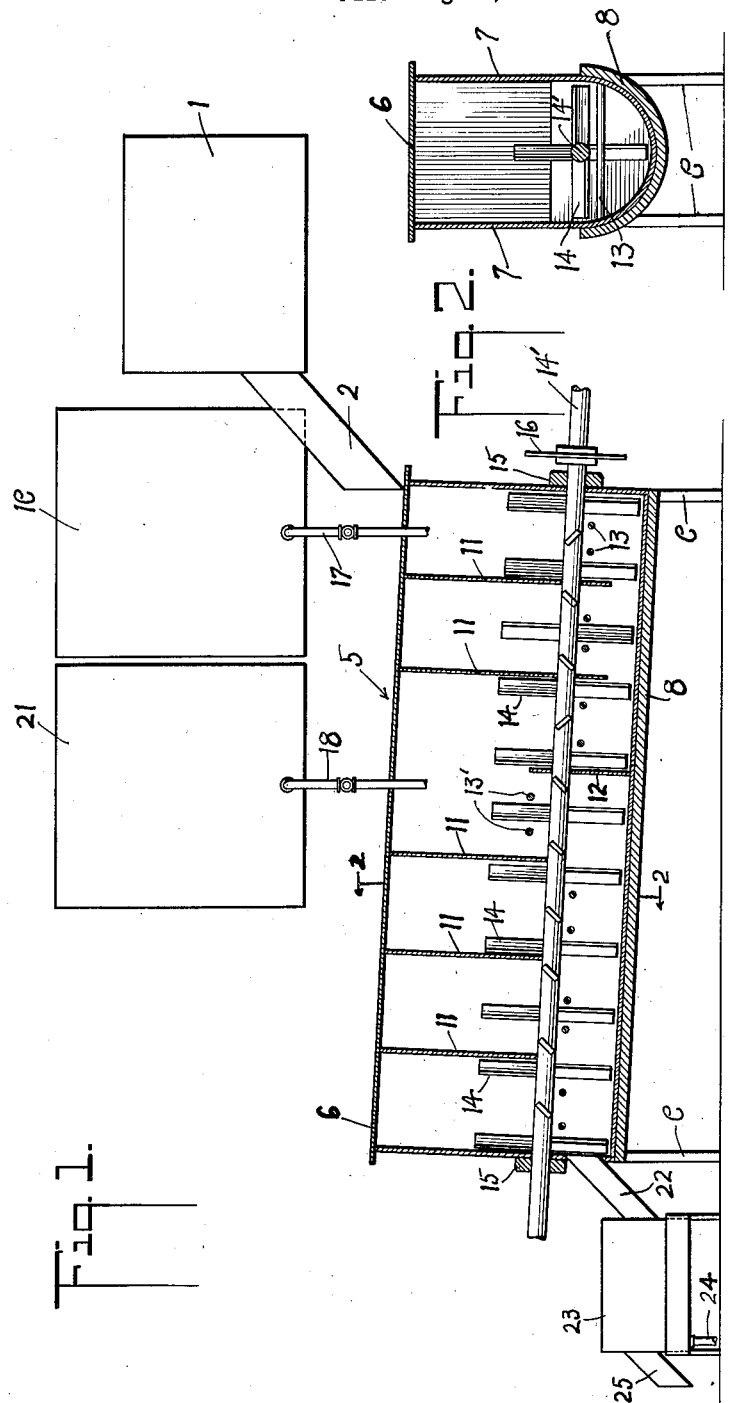
INVENTOR
Clifford I. Haney
BY
ATTORNEY Patented Apr. 29, 1941

2,239,782

UNITED STATES PATENT OFFICE 2,239,782

PRECIPITATION OF ORGANIC DERIVATIVES OF CELLULOSE MATERIALS

Clifford I. Haney, Drummondville, Quebec, Canada, assignor to Celanese Corporation of America, a corporation of Delaware Application August 2, 1938, Serial No. 222,646

1 Claim. (Cl. 260—230)

This invention relates to the production of organic derivatives of cellulose, and more particularly to a method of precipitating organic esters of cellulose from the solution in which they are formed.

An object of this invention is to provide an improved method of precipitating organic esters of cellulose in a continuous manner and under conditions which may be so controlled as to produce any desired type of fiber.

Another object of the invention is the prevention of the escape of acid fumes into the work rooms, which acid fumes cause discomfort and inconvenience to employees and great corrosive damage to buildings and machinery.

A further object of the invention is the provision of a method of precipitating organic esters of cellulose from acid solutions wherein a uniform and continuous feed of precipitated material is delivered to the washers and driers, and a uniform strength of acid is delivered to the acid recovery system. Other objects of this invention will appear from the following detailed description and drawing.

In the drawing, wherein like reference numerals refer to the same or similar elements in both views:

Fig. 1 is a side elevation, partly in section, of a precipitating device constructed in accordance with this invention, and Fig. 2 is a cross-sectional view taken on line 2—2 of Fig. 1.

In the production of organic derivatives of cellulose, and especially organic esters of cellulose, the solution in which the derivative of cellulose is produced contains a catalyst and side products of the reaction. The esterification of cellulose with an organic acid results in a solution of the derivative of cellulose in an acid solvent. These derivatives of cellulose are precipitated by adding water until the concentration of the acid reaches a point below which the acid will not hold the derivative of cellulose in solution. The addition of water to the solution at a fast rate would result in a hard gel which is almost impossible to redissolve. Therefore, it is customary to feed in the water slowly and precipitate gradually thus producing a fibrous or crumb-like precipitate. Commercially this precipitation step has been carried out by batch processes in huge bowls equipped with power driven beaters. I have found that the derivative of cellulose may be precipitated on a commercial scale in a continuous precipitator and that the physical structure of the precipitate may be controlled.

In accordance with my invention, I construct a device for continuously precipitating derivatives of cellulose in which the derivative of cellulose, continuously fed thereto, passes through a plurality of zones where a precipitating liquid is added and thoroughly mixed with the derivative of cellulose and solvent. By controlling the type and amount of precipitating liquid and the speed of the material through the various zones, there are produced precipitates having any desired physical form from fine fibers, coarse fibers and crumbs to gelled lumps.

This invention is applicable to the production of organic derivatives of cellulose such as the organic esters of cellulose and the cellulose ethers. Examples of the organic esters of cellulose are cellulose acetate, cellulose formate, cellulose propionate and cellulose butyrate, while examples of the ethers of cellulose are ethyl cellulose, methyl cellulose and benzyl cellulose. Although the invention is applicable to the production of any organic derivative of cellulose, it will be described with reference to the production of the commercially most important organic derivative of cellulose, namely cellulose acetate.

While, in accordance with this invention, the cellulose acetate or other organic ester of cellulose may be precipitated from any solution such as, for instance, solutions formed by dissolving the prepared cellulose acetate in suitable solvents, it is particularly important in connection with the precipitation of cellulose acetate or other organic esters of cellulose from esterifying mixtures, that is to say from solutions formed by the esterification of cellulose by means of formic acid or the anhydride or chloride of acetic acid, propionic acid, butyric acid and the like in the presence of a catalyst such as sulphuric acid, phosphoric acid or other suitable acid catalysts, and also in the presence of a sufficient amount of solvent such as acetic acid, propionic acid, butyric acid, etc., to cause the resulting cellulose ester to dissolve to form a heavy viscous solution of the consistency of molasses.

In making cellulose acetate by the so-called solution method, cellulose is acetylated by means of acetic anhydride and a catalyst in the presence of a relatively large amount of acetic acid which dissolves the cellulose acetate that is formed to produce a very heavy, viscous solution. This solution, usually after hydrolysis, or ripening to develop the desired solubility characteristics, is then precipitated by the addition of a precipitating liquid, such as water, which dilutes the acetic acid to such an extent that it is no longer capable of holding the cellulose acetate in solution. However, since the solution of cellulose acetate is very viscous the precipitating liquid draws the solvent from the cellulose acetate such that it forms a gel if no stirring accompanies the addition of the precipitating liquid. If the precipitating liquid is beaten into the batch the precipitating liquid acts on the particles or streams of the cellulose acetate to precipitate the same in shreds with sort of a case hardening effect with the result that the acid used as catalyst or as reagent becomes trapped within the particles and cannot be thoroughly removed by washing. However, if more vigorous stirring and beating is employed and the precipitant is diluted with solvent for the cellulose acetate, the cellulose acetate is precipitated in the form of finer and softer fibers which may readily be stabilized by washing and quickly redissolved.

By employing the method of this invention cellulose acetate may be precipitated in such a manner as to obtain any desired type of precipitation. For instance, there may be obtained large fibers which are not completely hardened and which may be hardened by passing them into a more concentrated bath of precipitant such as the water employed in washing the fibers. Although this type of fiber is sometimes desired, it is rather difficult to dissolve in acetone and similar solvents employed in the production of artificial silk from the cellulose acetate. However, by treating the cellulose acetate in several stages or zones and controlling the time that the cellulose acetate remains in each of the various zones and the concentration of the precipitating liquid added thereto in each zone or in some of the zones only, fibers of smaller size may be produced. The fiber produced is not only more uniform than that obtained by the use of the batch process, but the fiber produced may be, as pointed out above, completely hardened when discharged from the precipitator of the present invention. The finer fibers formed by the addition of solutions having a greater thinning action and weaker precipitating action, especially in the first zone or in the first three zones, are more easily stabilized and freed of any acid which is entrapped therein.

When precipitating low viscosity cellulose acetate it is possible to precipitate the same in fine fibrous form using a 20% solution of acetic acid in the first three zones or dilution zones as well as in the precipitating zone. If extremely low viscosity cellulose acetate is being precipitated, water could be used for precipitation.

For a more complete understanding of the invention, the same will be described with reference to the accompanying drawing wherein a preferred embodiment of my invention is shown. In this embodiment a receptacle 1 is provided for receiving the solution of cellulose acetate from an esterifying process or other process wherein the derivative of cellulose is in solution such as, for example, a ripening process. The receptacle 1 is connected through a discharge chute or feed line 2 to a continuous precipitator generally indicated by the reference numeral 5. The precipitator is formed of a suitable housing containing a top 6 mounted on sides 7 formed with an integral U-shaped bottom, which bottom forms the precipitator trough. These sides and bottom of the precipitator are formed of any suitable material which will withstand the action of the solutions passing through the same and may be reinforced by a heavier member 8 adapted to hold the sides 7 in position and support the weight of the materials contained therein. This support 8 may be held at the desired angle and suitable distance from the floors by means of legs 9. The precipitator is divided into zones by means of baffle plates 11 extending from the top 6 and baffle plate 12 extending from the bottom. Although one baffle plate 12 is shown extending from the bottom, a plurality of such baffle plates may be employed in spaced relation. Suitably positioned in the trough are stationary transverse rods 13 which, operating in conjunction with the baffle blades 14 mounted on a shaft 14', tend to break up and stir or beat the cellulose acetate in the various liquids. The shaft 14' extends the full length of the precipitator and is suitably journalled in the ends by means of bearings 15. This shaft 14' may be driven from any source of power through the medium of a sprocket wheel 16 or other suitable driving connection.

Suitable pipe connections 17 and 18 connect the precipitator with storage tanks or mixing tanks 19 and 21, respectively, which contain diluting fluids and precipitating fluids. Obviously any number of these connecting pipe lines 17 and 18 may be employed so that it is within the purview of this invention to have such a line entering each zone of the precipitator. At the end of the precipitator opposite to the feed line 2 is a discharge sluiceway 22 which acts as a delivery means for the precipitated cellulose acetate and dilute acid to a separating device 23 from which the dilute acid is withdrawn through the pipe 24 and the drained cellulose acetate is ejected through the conduit 25.

It will be noted that all the transverse rods 13 are located below the rotating shaft 14' except those shown at 13' which are in a zone immediately following the partition extending from the bottom of the precipitator. If more such zones are employed than shown in the drawing, then these transverse rods 13 in said zones should be located above the rotating shaft as the material is fed over the partition and is intended to pass under the next partition, and if the transverse rods are located below the shaft the material merely bridges above the shaft and is not stirred or mixed in with the precipitating liquid. The shaft 14', as stated, is equipped with a plurality of paddle blades 14 some of which are employed for beating the cellulose acetate with the diluting and precipitating liquids while others are employed to move the whole bulk of material forward in the precipitator. The reversing of these paddles at regular intervals does away with the danger of any local pocketing of the cellulose acetate and also controls the length of time a given quantity of cellulose acetate remains in any zone.

In operation, a solution of cellulose acetate to be precipitated enters the precipitator through the feed line 2 which may be in the form of a feed line with an orifice and valve or a pump may be interposed to positively feed the solution at a definite rate. The solution enters the first zone of the precipitator where it is mixed with a diluted precipitant coming from the tank 19. It is then carried through the second and third zone where it is intimately mixed with the diluted precipitant in order to thin down the solution. It then passes over the baffle 12 into the fourth zone where it is mixed with a more concentrated precipitating liquid coming from the tank 21. Precipitation commences in this zone and continues as the mass is moved through the fifth, sixth and seventh zones where precipitation is complete. The precipitated material along with the dilute acid is discharged through the sluiceway 22 into a separator 23 which may be of the rotating type or shaker type whereby the precipitated cellulose acetate is drained of the acid. The dilute acid is drawn off through pipe 24 to an acid recovery system while the drained cellulose acetate is discharged through the chute 25 to a washer, stabilizer, drier or other device.

The advantage of dividing the precipitator into zones is that a definite step takes place in each one and the pitch of the blades 14 may be so regulated that they act as beaters, stirrers or merely to progress the material through the precipitator. In each zone the pitch of the blades may be regulated to perform any of the above actions as desired.

As an illustration of the operation of the device cellulose acetate dissolved in substantially glacial acetic acid coming from an acetylizer enters the precipitator into the first zone at the rate of 7½ parts by weight per minute. About 8.25 parts by weight per minute of 40% acetic acid is added to the solution of cellulose acetate in the first zone wherein it is mixed into the solution and passed onto the second and third zones where further mixing takes place such that the solution of cellulose acetate entering the fourth zone is substantially thinned down. In the fourth zone 7.2 parts by weight per minute of 18% acetic acid is added and mixed into the thinned down solution effecting the commencement of precipitation. The whole mass is then carried to the fifth, sixth and seventh zones where the precipitating liquids are whipped or beat into the solution of cellulose acetate effecting a precipitation thereof producing 96 parts of cellulose acetate on the dry basis per hour and delivering acetic acid of 46.1% concentration from the separator. By employing this invention any type of precipitated cellulose acetate may be obtained. If the cellulose acetate is passed quickly through the precipitator a rather hard crumb type precipitate results, whereas if the cellulose acetate is passed more slowly through the precipitator there results a very fine fibrous precipitate. The example given above produces a fibrous precipitate well adapted for future processing such as stabilizing, washing and redissolving in acetone or other solvent for the purpose of making artificial filaments or films. Obviously the concentration and amount of precipitate added will also govern the type of precipitant acquired.

If desired, sodium carbonate or alkali earth metal salts or other such chemical reagents may be introduced into any or all of the zones to substantially neutralize the inorganic acid catalyst and effect changes in the cellulose acetate as well known in the art. The addition of sodium carbonate tends to neutralize the inorganic acid catalyst and also produce a gas. This latter step tends to make a more voluminous precipitate.

The precipitator being continuous it may be hooked directly to a rotary washer as the feeder therefore thus eliminating the feeder compartment now necessary in rotary washers, or it may be hooked directly to a continuous stabilizing or drying device. The uniform type of fiber obtained is better stabilized and washed by continuous methods than heretofore obtained.

It is to be understood that the foregoing detailed description is merely given by way of illustration and that many variations may be made therein without departing from the spirit of my invention.

Having described my invention, what I desire to secure by Letters Patent is:

The process of precipitating cellulose acetate from its acetylation solution in acetic acid, comprising adding to such solution an aqueous solution of acetic acid of substantially 40% concentration to thin the solution without precipitating the cellulose acetate, passing the same to another zone and mixing the same, passing the relatively thinned solution of the cellulose acetate to another zone and adding thereto an aqueous solution of acetic acid of substantially 18% concentration in amount sufficient to cause precipitation of the cellulose acetate and mixing the same while continuously passing the same through a series of zones whereby the cellulose acetate is precipitated.

CLIFFORD I. HANEY.